United States Patent
Shao et al.

(10) Patent No.: US 7,301,298 B2
(45) Date of Patent: Nov. 27, 2007

(54) BACK EMF DETECTION CIRCUIT AND METHOD FOR A SENSORLESS BRUSHLESS DC (BLDC) MOTOR

(75) Inventors: Jianwen Shao, Hoffman Estates, IL (US); Dennis Nolan, Elk Grove Village, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 11/082,288

(22) Filed: Mar. 17, 2005

(65) Prior Publication Data

US 2006/0152181 A1   Jul. 13, 2006

Related U.S. Application Data

(60) Provisional application No. 60/642,377, filed on Jan. 7, 2005.

(51) Int. Cl.
    *G05B 11/28*   (2006.01)
(52) U.S. Cl. .................. 318/599; 318/811; 318/459; 318/500; 318/254
(58) Field of Classification Search ............. 318/138, 318/254, 439, 459, 500, 599, 811; 388/928.1
    See application file for complete search history.

(56) References Cited

U.S. PATENT DOCUMENTS

| | | | |
|---|---|---|---|
| 4,654,566 A | | 3/1987 | Erdman |
| 5,367,234 A | * | 11/1994 | DiTucci .................. 318/254 |
| 5,640,073 A | * | 6/1997 | Ikeda et al. .............. 318/439 |
| 5,783,920 A | | 7/1998 | Hahn |
| 5,796,545 A | | 8/1998 | Canclini |
| 5,818,179 A | * | 10/1998 | Kokami et al. ........... 318/254 |
| 5,859,512 A | * | 1/1999 | Buthker .................. 318/254 |
| 5,859,521 A | | 1/1999 | Tajima et al. |
| 5,862,301 A | | 1/1999 | Gontowski, Jr. |
| 6,094,022 A | * | 7/2000 | Schillaci et al. .......... 318/254 |
| 6,201,366 B1 | * | 3/2001 | Menegoli ................ 318/590 |
| 6,380,707 B1 | * | 4/2002 | Rosholm et al. .......... 318/439 |
| 6,633,145 B2 | * | 10/2003 | Shao et al. .............. 318/254 |
| 2003/0231875 A1 | * | 12/2003 | Masino ................ 388/928.1 |

* cited by examiner

*Primary Examiner*—Rina Duda
(74) *Attorney, Agent, or Firm*—Lisa K. Jorgenson; Andre M. Szuwalski

(57) ABSTRACT

A prior art direct back EMF detection method synchronously sampled motor back EMF during PWM "off" time without the need to sense or re-construct the motor neutral in a sensorless brushless DC (BLDC) motor drive system. Since this direct back EMF sensing scheme requires a minimum PWM "off" time to sample the back EMF signal, the duty cycle cannot reach 100%. Also in some applications, for example, high inductance motors, the long settling time of a parasitic resonant between the motor inductance and the parasitic capacitance of power devices can cause false zero crossing detection of back EMF. An improved direct back EMF detection scheme samples the motor back EMF synchronously during PWM "on" time at high speed. In the final system the motor back EMF can be detected during PWM "off" time at low speed, and it is detected during PWM "on" time at high speed. With the combination of the prior art and the improved back EMF sensing schemes, the duty cycle can be extended to a 100% duty cycle, and the impact of the parasitic resonant between motor inductance and the power device capacitance can be minimized.

16 Claims, 7 Drawing Sheets

BACK EMF DETECTION CIRCUIT AND METHOD FOR A SENSORLESS BRUSHLESS DC (BLDC) MOTOR

CROSS REFERENCE

This application claims the benefit of U.S. Provisional Application for Patent Ser. No. 60/642,377, filed Jan. 7, 2005, the disclosure of which is hereby incorporated by reference.

BACKGROUND OF THE INVENTION

1. Technical Field of the Invention

The present invention relates to sensorless brushless DC (BLDC) motors and, in particular, to back EMF detection with respect to such motors.

2. Description of Related Art

Sensorless Brushless DC (BLDC) motor drives are becoming widely used as small horsepower motor controls due to their high efficiency, reliability, low maintenance and low cost. An article by J. Shao, et al., entitled "A Novel Direct Back EMF Detection for Sensorless Brushless DC (BLDC) Motor Drives," Applied Power Electronic Conference (APEC 2002), pp 33-38, the disclosure of which is hereby incorporated by reference ("the Shao Article"), proposes a direct back EMF sensing scheme in which true back EMF signals can be directly extracted for each phase without sensing the neutral point of the motor by synchronously detecting the back EMF during PWM off time. This method demonstrates better performance than the traditional methods which are based on motor neutral voltage information (see, for example, U.S. Pat. No. 4,654,566, and T. Endo, et al., "Microcomputer Controlled Brushless Motor without a Shaft Mounted Position Sensor," IPEC-Tokyo, 1983, the disclosures of which are hereby incorporated by reference).

However, since the direct back EMF sensing scheme of the Shao Article requires minimum PWM "off" time in order to sample the back EMF signal, the duty cycle cannot reach 100%. On the other hand, in some applications, for example, high inductance motors, the long settling time of a parasitic resonant between the motor inductance and the parasitic capacitance of power devices can cause false zero crossing detection of back EMF.

This application for patent analyzes the impact of this parasitic resonant on back EMF zero crossing detection. An improved direct back EMF detection scheme which samples the motor back EMF synchronously during PWM "on" time is proposed to overcome the foregoing problems.

Generally, a brushless DC motor is driven by a three-phase inverter with what is called six-step commutation. The commutation phase sequence is of the format AB-AC-BC-BA-CA-CB. Each conducting phase is called one step. The conducting interval for each phase is 120° by electrical angle. Therefore, only two phases conduct current at any time, leaving the third phase floating. This opens a window to detect the back EMF in the floating winding.

FIG. 1 shows the typical inverter configuration and current commutation sequence for a brushless sensorless DC motor. In accordance with the prior art method of the Shao Article, the PWM signal is applied on the high side switches (T1, T3 and T5) only, and the back EMF signal is synchronously sampled only during the PWM off time. The low side switches (T2, T4 and T6) are only switched to commutate the phases of the motor. The true back EMF can be detected during off time of the PWM signal because the terminal voltage of the motor is directly proportional to the phase back EMF during this interval. Also, the back EMF information is referenced to ground, which eliminates the common mode noise, and the synchronous sampling rejects the high-frequency switching noise. The start-up performance is good since there is no signal attenuation.

Since the back EMF is detected during PWM "off" time, a minimum off time is necessarily required for the operation to occur. In low voltage applications, like automotive fuel pumps (see, J. Shao, et al., "A Novel Microcontroller-Based Sensorless Brushless (BLDC) Motor Drive for Automotive Fuel Pumps," IEEE Transaction on Industry Applications, November/December 2003, Vol. 39, No. 6, pp 1734-1740, the disclosure of which is hereby incorporated by reference), a 100% duty cycle operation is desired to fully utilize the battery voltage.

It has also been found that in some HVAC applications the back EMF zero crossing is not truthfully detected at high speed/high duty cycle if the motor winding inductance is high.

Still further, the parasitic capacitance of power switches (for example, IGBT's) will resonate with the motor inductance in the floating phase during PWM off time.

All of the foregoing present problems with the use of the technique disclosed by the Shao Article.

Operation of the technique proposed by the Shao Article may be better understood by reference to an example. Assume a particular step where phase A and phase B are conducting current, and phase C is floating. The upper switch of phase A (i.e., T1) is controlled by the PWM signal and lower switch of phase B (i.e., T4) is on during the whole step. The terminal voltage Vc is sensed. FIG. 2A shows a circuit equivalent for this particular example.

When the upper switch (T1) of the half bridge is turned off responsive to the PWM signal (and the lower switch T4 remains on), the current freewheels through the diode D associated with the lower switch T2 of phase A. During this freewheeling period, the terminal voltage Vc is detected using a comparator circuit as Phase C BEMF when there is no current in phase C.

From the equivalent circuit shown in FIG. 2A, it is easy to see $Vc=e_c+Vn$, where Vc is the terminal voltage of the floating phase C, $e_c$ is the phase back EMF and Vn, at the center or neutral point of the motor, is the neutral voltage of the motor.

From phase A, if the forward voltage drop of the diode is ignored, we have Eq (1):

$$Vn = 0 - ri - L\frac{di}{dt} - e_a$$

From phase B, if the voltage drop on MOSFET is ignored, we have Eq (2):

$$Vn = ri + L\frac{di}{dt} - e_b$$

Taking Eq (1) and Eq (2) together, we obtain Eq (3):

$$Vn = -\frac{e_a + e_b}{2}$$

Also from the balanced three-phase system, we know Eq (4):

$$e_a + e_b + e_c = 0$$

From combining Eq (3) and Eq (4), we obtain Eq (5):

$$Vn = \frac{e_c}{2}$$

So, the terminal voltage Vc is provided by Eq (6):

$$Vc = e_c + Vn = \frac{3}{2}e_c$$

From the above equations, it can be seen that during the off time of the PWM signal, which is the current freewheeling period, the terminal voltage of the floating phase is proportional to the back EMF voltage without any superimposed switching signals. It is also very important that this terminal voltage is directly referred to the ground instead of the neutral point. So, the neutral point voltage information is not needed in order to detect the back EMF zero crossing.

A simplified equivalent circuit for the circuit presented in FIG. 2A is shown in FIG. 2B (for when phase C is floating). At the beginning of PWM off time, the voltage Vc is:

$$Vc = \frac{1}{2}Vdc + \frac{3}{2}e_c$$

This is the initial condition for the resonant between L and Coes during PWM off time. Solving the L-C series resonant equation, the time for the terminal winding voltage to settle down can be estimated. Because the parasitic resonant between the motor inductance and the parasitic capacitance of power devices, it requires a longer off time for the winding terminal voltage to settle down from the transient during PWM off time. If the PWM off time is shorter than the settling time, false zero crossing of the back EMF may be detected.

FIG. 3 shows a block diagram of a circuit for back EMF detection during PWM off time. The power stage includes the drive transistors T1-T6 shown in FIG. 1. A gate drive circuit receives control signals (such as PWM on/off signals) and generates the gate drive signals for application to the power stage. The control signals are generated by a microcontroller (for example, an ST72141 microcontroller integrated circuit from STMicroelectronics). The back EMF sensing voltages are received by the microcontroller from the three phases of the motor through a set of resistors R1-R3 and are processed by an integrated zero crossing detection circuit. More specifically, the microcontroller implements the voltage detection/comparison operation (as shown in FIG. 2A) with respect to each motor phase for purposes of making back EMF detection and sensing motor position and rotation. The microcontroller further functions to generate the appropriate control signals in response thereto for purposes of actuating the motor.

Other prior art of interest include: (a) K. Rajashekara, A. Kawamura, and K. Matsuse, "Sensorless Control of AC Motor Drives," IEEE Press, 1996; and (b) S. Ogasawara and H. Akagi, "An Approach to Position Sensorless Drive for Brushless DC Motors," IEEE Trans. on IA, Vol. 27, No. 5, September/October 1991.

SUMMARY OF THE INVENTION

In accordance with an embodiment of the present invention, a back EMF sensing voltage of a floating motor phase is sampled during PWM drive signal on time for non-floating motor phases. The sampled back EMF sensing voltage is compared to a reference voltage in order to make a zero crossing detection.

In an aspect of the invention, the back EMF sensing voltage is attenuated prior to comparison with the reference voltage.

In an aspect of the invention, the reference voltage is an attenuated supply voltage.

In accordance with another embodiment of the present invention, a multi-mode back EMF sensing operation is performed. When a motor is operating at relatively lower speeds, a back EMF sensing voltage of a floating motor phase is sampled during PWM drive signal off time for non-floating motor phases. Conversely, when the motor is operating at relatively higher speeds, a back EMF sensing voltage of a floating motor phase is sampled during PWM drive signal on time for non-floating motor phases. In either mode, the sampled back EMF sensing voltage is compared to a certain one of a plurality of reference voltages in order to make a zero crossing detection.

In an aspect of the invention, when in the lower speed mode, the comparison is made against a first voltage, while when in the higher speed mode, the comparison is made against a second voltage. The second voltage may comprise an attenuated supply voltage.

In accordance with another embodiment, a first and second motor phase of a brushless sensorless DC motor are driven at a 100% PWM duty cycle while allowing a third motor phase to float. A back EMF voltage of the floating third motor phase during 100% PWM duty cycle on time is then sensed. The sensed back EMF voltage is then compared to a reference voltage in order to make a zero crossing detection.

Features of a sensing method in accordance with embodiments of the invention include 1) precise BEMF zero crossing detection; 2) it can be used to either high voltage or low voltage system; 3) fast motor start-up is possible because of precise BEMF zero crossing detection; 4) it is simple and low cost.

BRIEF DESCRIPTION OF THE DRAWINGS

A more complete understanding of the invention may be obtained by reference to the accompanying drawings wherein.

DETAILED DESCRIPTION OF THE DRAWINGS

Figure 2A:
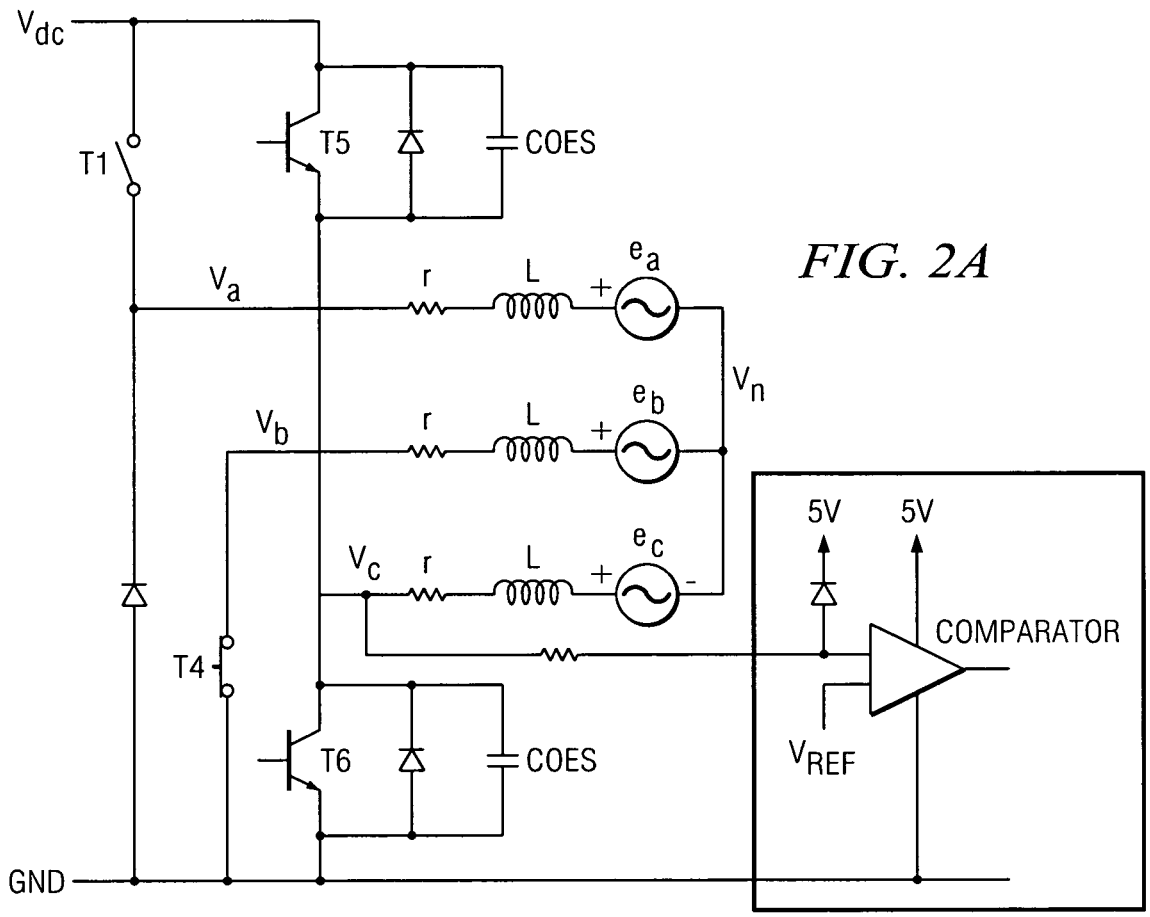
FIGS. 2A and 2B show circuit equivalents for a certain step in motor operation.
Figure 2B:
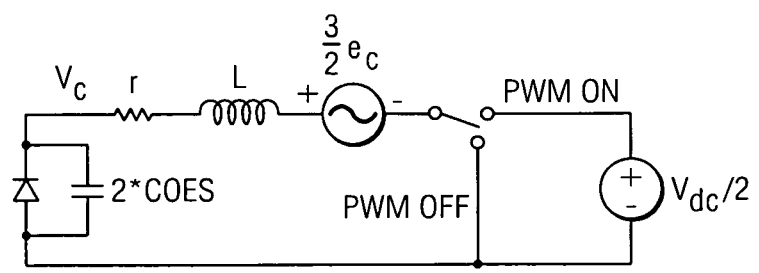
Figure 3:
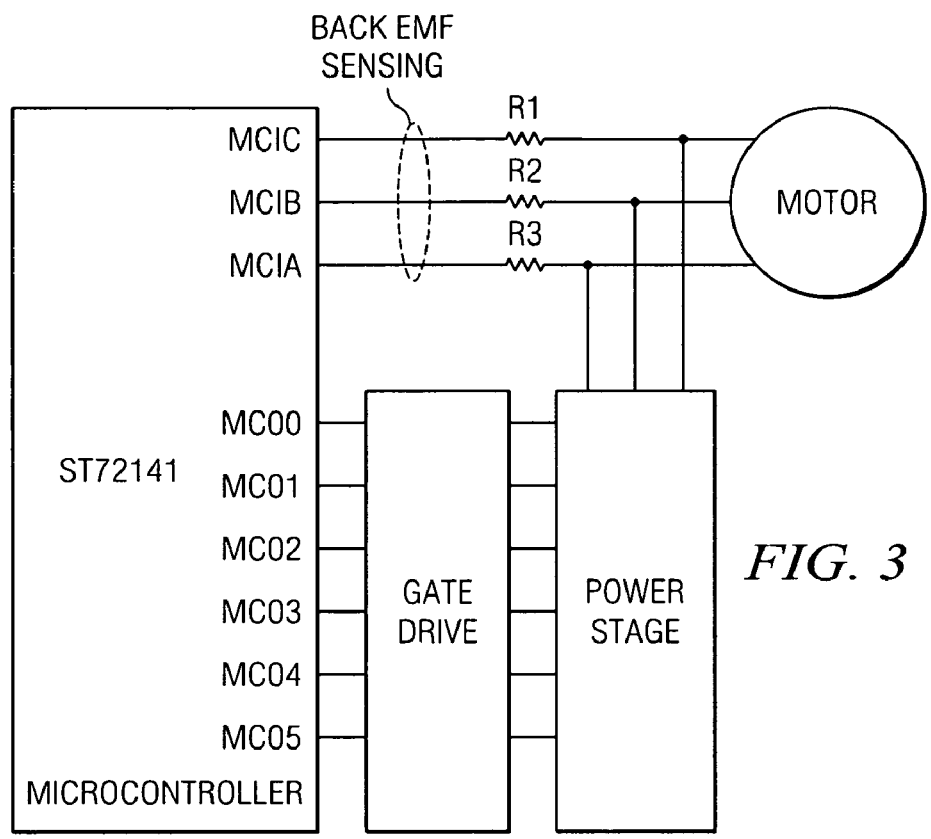
FIG. 3 shows a block diagram of a circuit for back EMF detection during PWM off time.
Figure 4:
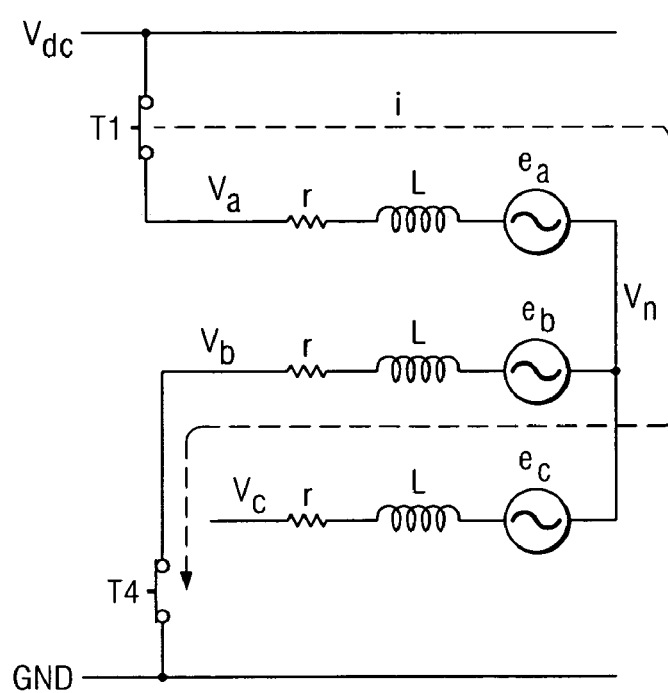
FIG. 4 shows a circuit equivalent for a certain step in motor operation.

Reference is now made to FIG. 4 wherein there is shown a circuit equivalent for a certain step in motor operation. It is possible to derive the floating phase terminal winding voltage during PWM on time. Assume a particular step where phase A and phase B are conducting current, and phase C is floating. The upper switch of phase A (i.e., T1) is controlled by the PWM signal and lower switch of phase B (i.e., T4) is on during the whole step. Unlike, the illustration of FIG. 2A, the operation occurs during PWM "on" time. Thus, the upper transistor T1 of the half bridge is turned on. The terminal voltage Vc is then sensed.

From phase A, we have Eq (7):

$$Vn = Vdc - ri - L\frac{di}{dt} - e_a$$

From phase B, we have Eq (8):

$$Vn = ri + L\frac{di}{dt} - e_b$$

From Eq (7) and Eq (8), we obtain Eq (9):

$$Vn = \frac{Vdc}{2} - \frac{e_a + e_b}{2}$$

Also, from the balanced three-phase system, we have Eq (10):

$$e_a + e_b + e_c = 0$$

From Eq (9) and Eq (10), we obtain Eq (11):

$$Vn = \frac{Vdc}{2} + \frac{e_c}{2}$$

So, the terminal voltage Vc is set forth in Eq (12):

$$Vc = e_c + Vn = \frac{3}{2}e_c + \frac{Vdc}{2}$$

From Eq (12) it is clear that the zero crossing of $e_c$ can be detected by comparing Vc against Vdc/2. This allows for synchronous detection of the back EMF during PWM on time. In this way, the back EMF detection process can be performed while still being able to achieve a 100% duty cycle. On the other hand, at a high duty cycle (but not 100%), there is enough time to wait for the winding terminal voltage to settle down if detection of the back EMF is made during PWM on time.

Figure 5:
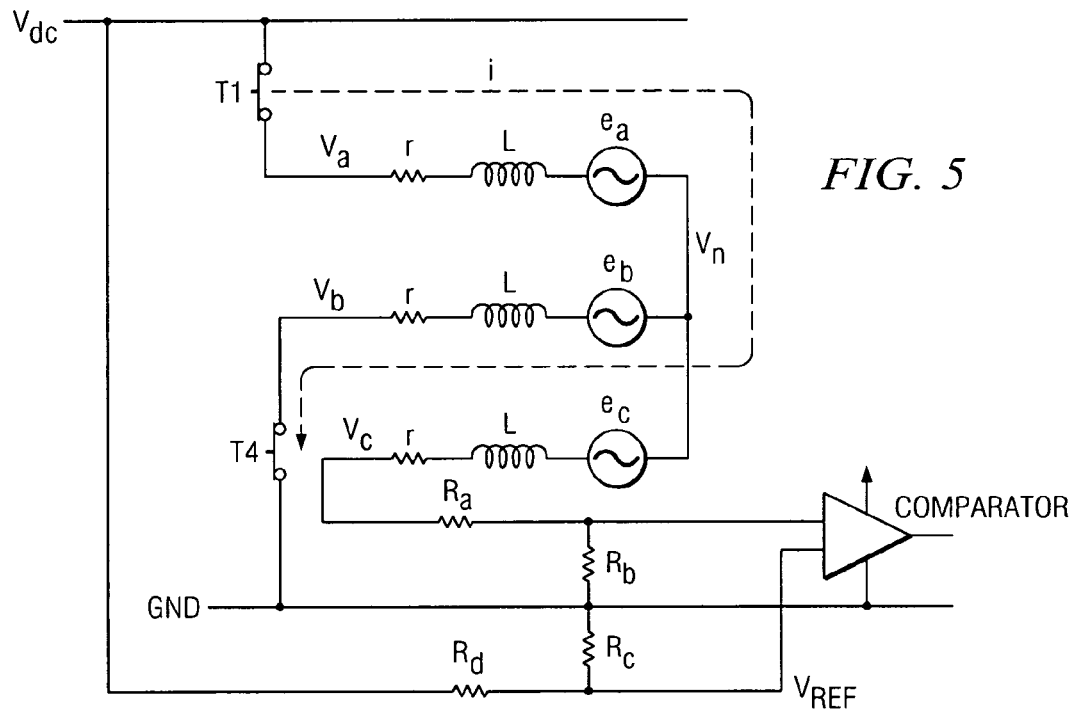
FIG. 5 shows a circuit implementation for back EMF detection during PWM "on" time in the floating phase.

FIG. 5 shows a circuit implementation for back EMF detection during PWM "on" time in the floating phase C. Depending on the voltage comparator used, the back EMF sensing voltage from phase C may have to be attenuated to the allowable range for the comparator using a suitable voltage divider circuit(s). The ratio relationship between the back EMF sensing voltage and the reference voltage derived from Vdc, for example, may be:

$$\frac{Rb}{Ra + Rb} = 2 * \frac{Rc}{Rc + Rd}$$

Figure 1:
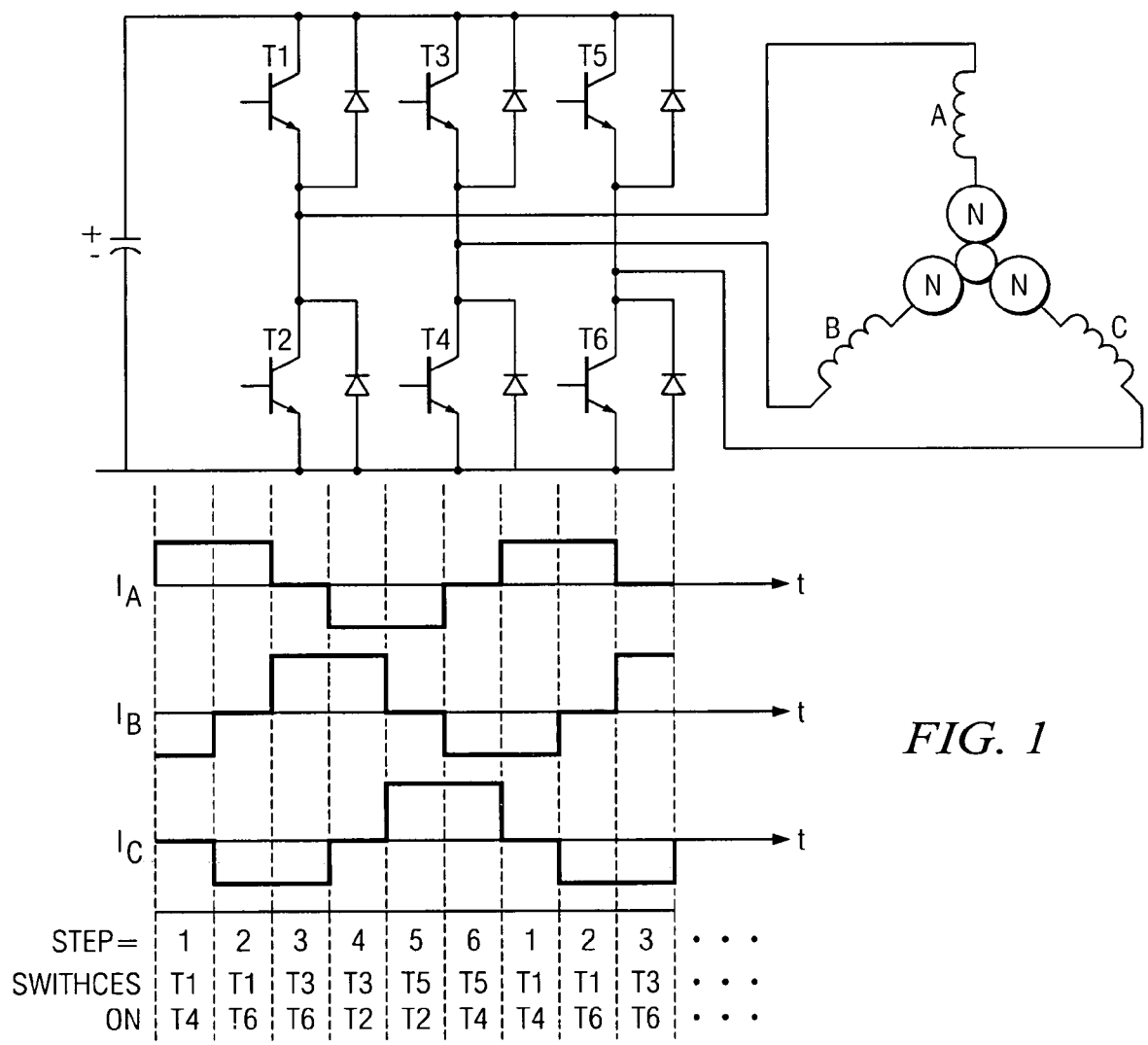
FIG. 1 shows the typical inverter configuration and current commutation sequence of a brushless sensorless DC motor.
Figure 6:
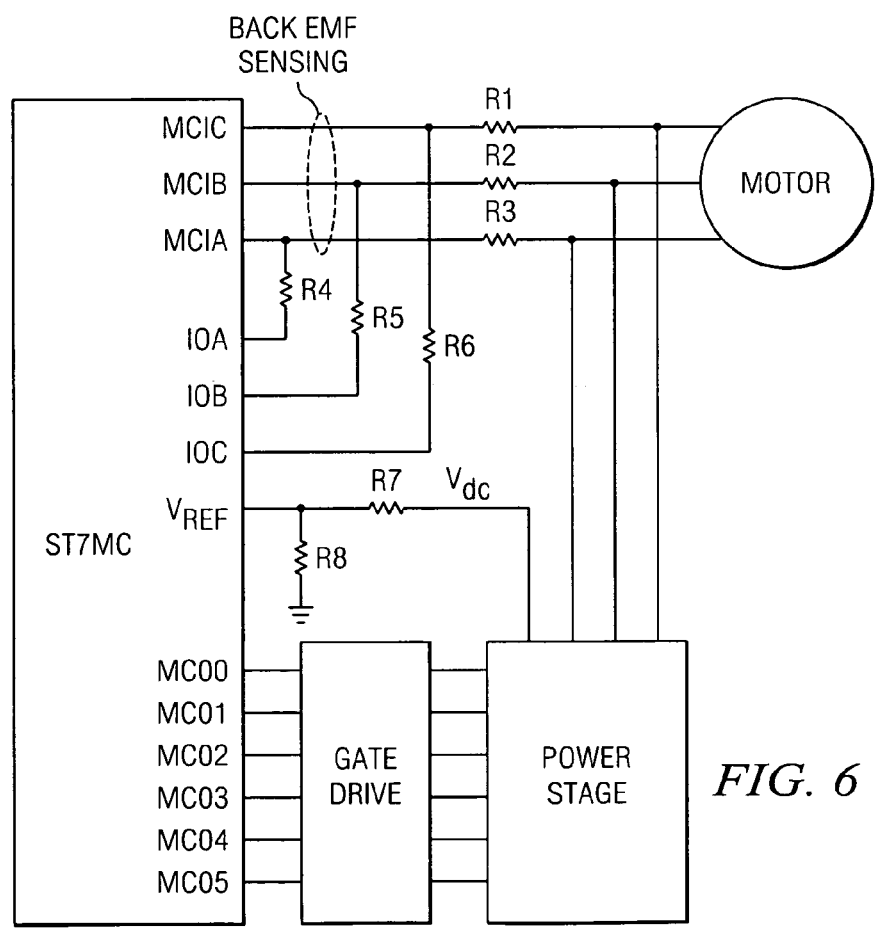
FIG. 6 shows a block diagram of a circuit for back EMF detection during PWM on time and off time.

FIG. 6 shows a block diagram of a circuit for back EMF detection during PWM on time and off time. The power stage includes the drive transistors T1-T6 shown in FIG. 1. A gate drive circuit receives control signals (such as PWM on/off signals) and generates the gate drive signals for application to the power stage. The control signals are generated by a microcontroller (for example, an ST7MC microcontroller integrated circuit from STMicroelectronics). The back EMF sensing voltages are received by the microcontroller from the three phases of the motor through a set of resistors R1-R3 (comprising resistor Ra for each phase) and are processed by a integrating zero crossing detection circuit. More specifically, the microcontroller implements the voltage detection/comparison operation (as shown in FIG. 5) with respect to each motor phase for purposes of making back EMF detection and sensing motor position and rotation. The microcontroller further functions to generate the appropriate control signals in response thereto for purposes of actuating the motor. A set of resistors R4-R6 are provided (one per phase comprising resistor Rb for each phase), to implement the necessary voltage division for signal attenuation. The supply voltage Vdc is further passed through a voltage divider formed from resistors R7-R8 (comprising resistors Rc and Rd) to supply the reference voltage to the microcontroller for use in the comparison operation.

When the motor is being driven at low speed, it is better to use back EMF detection during PWM "off" time, as in the prior art Shao Article, since there is no signal attenuation. At high speed, however, back EMF detection during PWM "on" time is preferably used to achieve a 100% duty cycle. In accordance with another embodiment, the microcontroller supports the combination of both methods in different modes, and thus allows the system to achieve better performance over a wide speed range. At low PWM duty cycle, microcontroller ports IOA, IOB, and IOC are configured as floating inputs. There accordingly will be no attenuation of the back EMF sensing voltage since resistors R4, 5 and R6 connect to the floating points. When configured in this mode, the microcontroller detects the zero crossing of the back EMF during PWM off time in the manner taught by the prior art Shao Article. In this mode, the reference voltage can be internally set at a certain voltage (for example, 0.2V). Conversely, at high duty cycle, microcontroller ports IOA, IOB, and IOC are re-configured as outputs and set to logic low (0V). The accordingly will be attenuation of the back EMF sensing voltages by the ratio of the resistors R1/R4, R2/R5 and R3/R6. When configured in this mode, the microcontroller detects the zero crossing of the back EMF during PWM on time in the manner taught herein. In this mode, the microcontroller can use the attenuated dc bus voltage Vdc as the reference for zero crossing detection.

Figure 7:
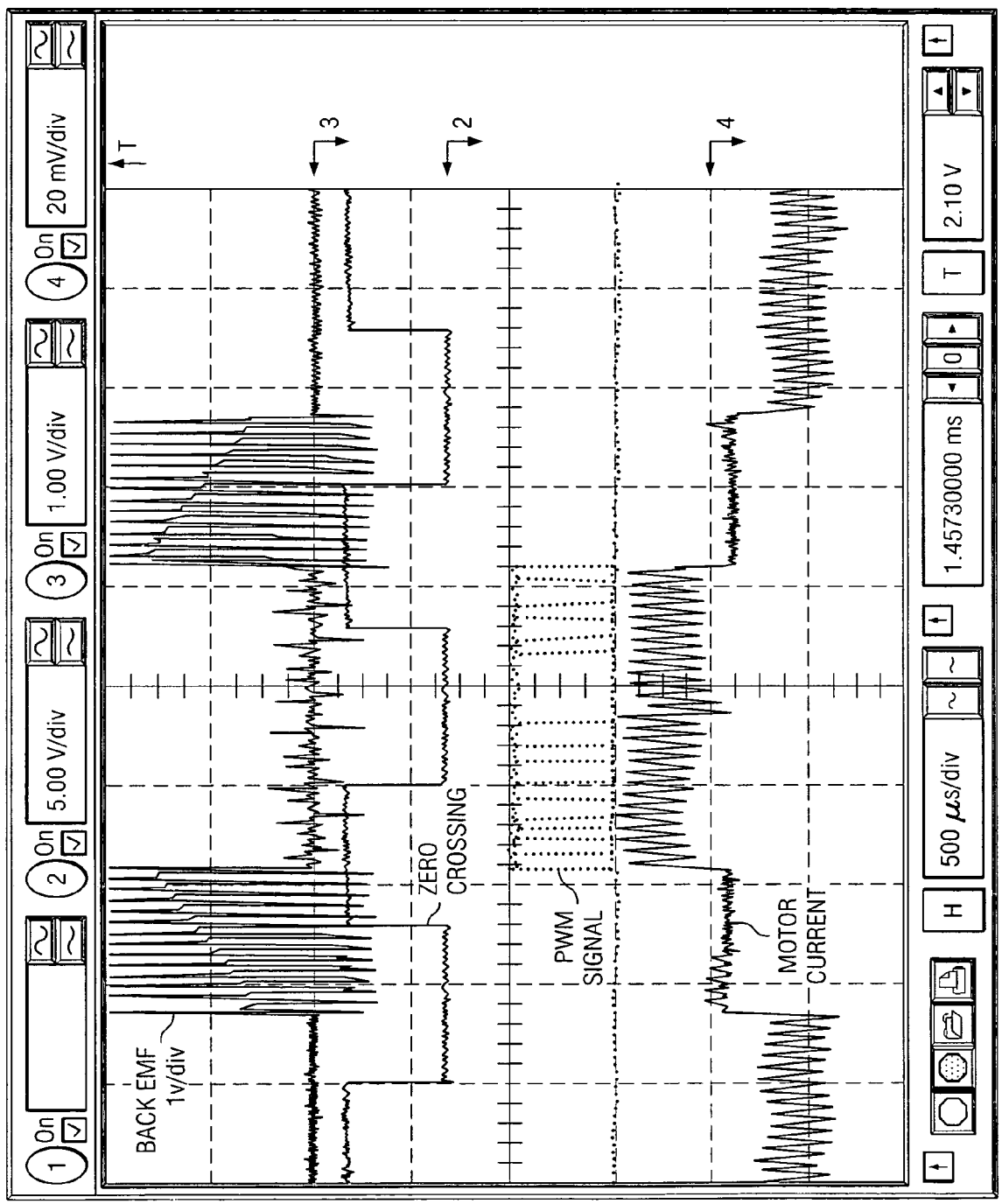
FIG. 7 shows waveforms for operation of the direct back EMF detection scheme during PWM on time and off time at high duty cycle.

FIG. 7 shows waveforms for operation of the direct back EMF detection scheme during PWM on time at high duty cycle.

Figure 8:
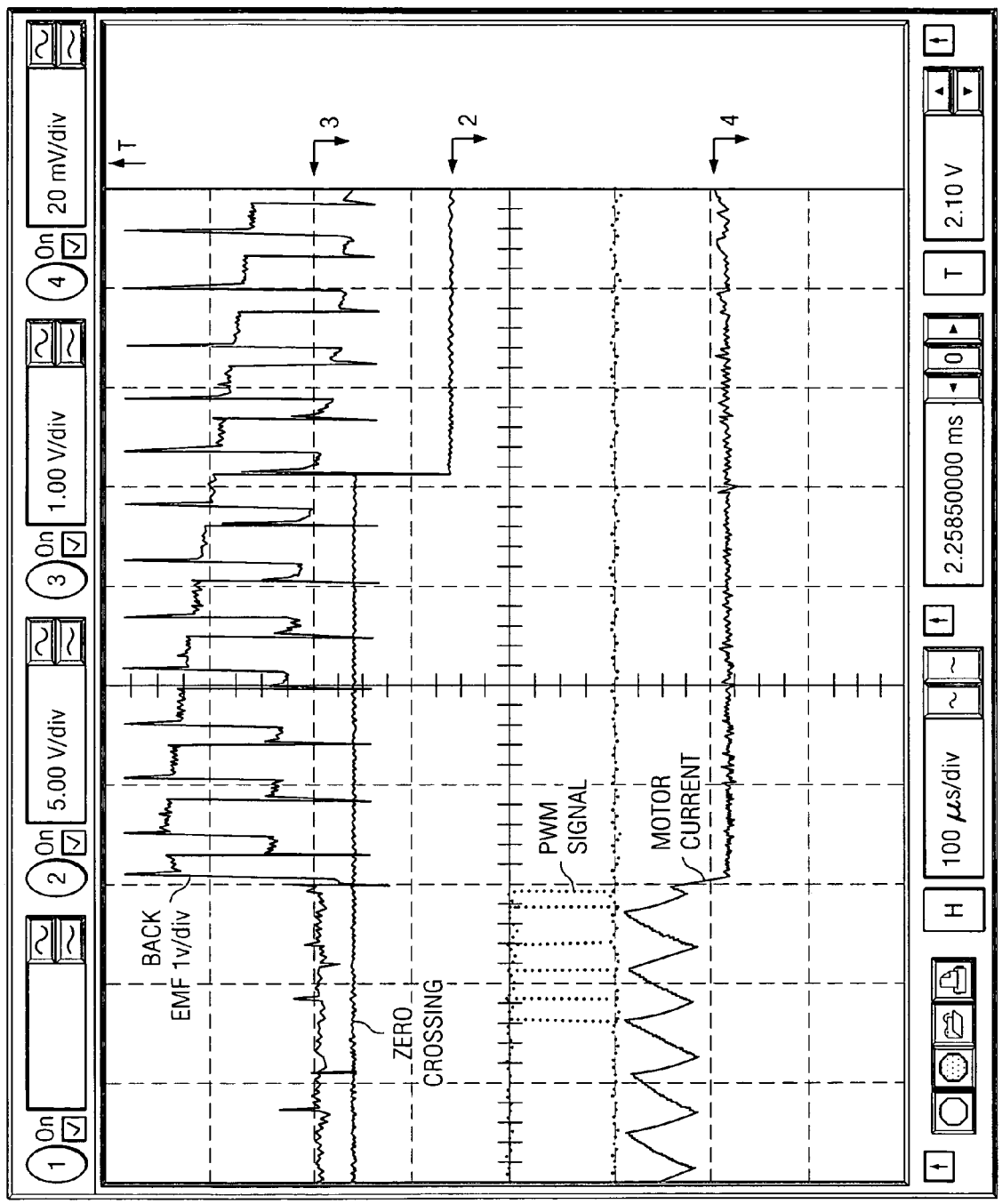
FIG. 8 shows a zero crossing being detected at the end of PWM on time.

FIG. 8 shows a zero crossing being detected at the end of PWM on time.

Figure 9:
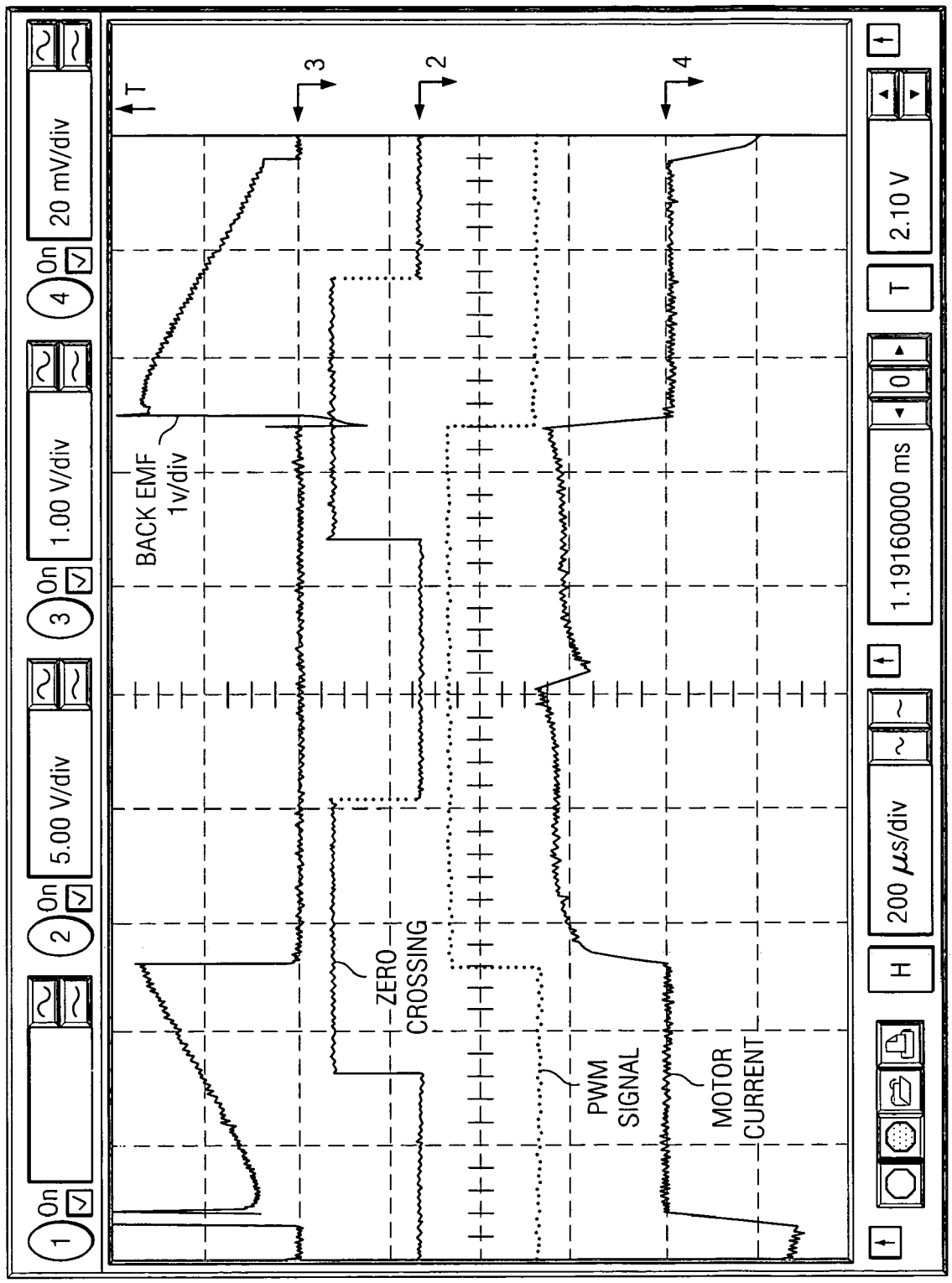
FIG. 9 is a similar waveform demonstrating that the system is running at a 100% duty cycle.

FIG. 9 is a similar waveform demonstrating that the system is running at a 100% duty cycle.

In conclusion, the original direct back EMF sensing scheme during PWM off time has a limitation on duty cycle since it requires a minimum PWM off time in order to do the detection. The resonant transient caused by motor inductance and the power devices' parasitic capacitance will further limit the duty cycle. In accordance with embodiments of the invention, an improved direct back EMF sensing scheme, which does the back EMF sensing during PWM on time, eliminates the duty cycle limitation. This solution allows the motor to run at a 100% duty cycle, and further avoids the parasitic resonant transient. During motor start-up and low speed, it is preferred to use the original PWM off time scheme since there is no signal attenuation. However, at high speed, the system is switched to the improved back EMF sensing scheme. With the combination of two detection schemes in one system, the motor can run very well over wide speed range.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:
    sampling a back EMF sensing voltage of a floating motor phase during PWM drive signal off time with respect to non-floating motor phases when a motor is operating at relatively lower speeds;
    sampling the back EMP sensing voltage of the floating motor phase during PWM drive signal on time with respect to non-floating motor phases when the motor is operating at relatively higher speeds; and
    comparing the sampled back EMF sensing voltage to a certain one of a plurality of reference voltages in order to make a zero crossing detection.

2. The method of claim 1 wherein, when in the lower speed mode, comparing comprises comparing against a first voltage, and when in the higher speed mode, comparing comprises comparing against a second voltage.

3. The method of claim 2 wherein the second voltage comprises an attenuated supply voltage.

4. The method of claim 1 wherein sampling during PWM on time further includes selectively attenuating the back EMF sensing voltage of the floating motor phase.

5. The method of claim 4 wherein sampling during PWM off time further comprises selectively not attenuating the back EMF sensing voltage of the floating motor phase.

6. A method comprising:
    driving a first and second motor phase of a brushless sensorless DC motor at a 100% PWM duty cycle while allowing a third motor phase to float;
    sensing a back EMF voltage of the floating third motor phase during 100% PWM duty cycle on time;
    comparing the sensed back EMF voltage to a reference voltage in order to make a zero crossing detection;
    switching to sensing the back EMF voltage of the floating third motor phase during PWM duty cycle off time when the duty cycle is less than 100%; and
    comparing the sensed back EMF voltage to a different reference voltage in order to make a zero crossing detection.

7. The method of claim 6 further comprising attenuating the back EMF sensing voltage prior to comparison with the fixed reference voltage.

8. The method of claim 6 wherein the fixed reference voltage is an attenuated supply voltage.

9. A system, comprising:
    a circuit having a first mode that samples a back EMF sensing voltage of a floating motor phase during PWM drive signal off time for non-floating motor phases when a motor is operating at relatively lower speeds, and having a second mode that samples the back EMF sensing voltage of the floating motor phase during PWM drive signal on time for non-floating motor phases when the motor is operating at relatively higher speeds; and
    a comparator to compare the sampled back EMF sensing voltage to a certain one of a plurality of reference voltages in order to make a zero crossing detection.

10. The system of claim 9 wherein, when in the lower speed mode, the comparator compares against a first voltage, and when in the higher speed mode, the comparator compares against a second voltage.

11. The system of claim 10 wherein the second voltage comprises an attenuated supply voltage.

12. The system of claim 9 further including an attenuator to selectively attenuate the back EMF sensing voltage of the floating motor phase during PWM on time.

13. The system of claim 12 wherein the attenuator selectively does not attenuate the back EMF sensing voltage of the floating motor phase during PWM off time.

14. A system comprising:
    a circuit for driving a first and second motor phase of a brushless sensorless DC motor at a 100% PWM duty cycle while allowing a third motor phase to float;
    a sensing circuit that senses a back EMF voltage of the floating third motor phase during 100% PWM duty cycle on time; and
    a comparator to compare the sensed back EMF voltage to a reference voltage in order to make a zero crossing detection;
    the sensing circuit switching to sensing the back EMIF voltage of the floating third motor phase during PWM duty cycle off time when the duty cycle is less than 100%; and
    the comparator comparing the sensed back EMF voltage to a different reference voltage in order to make a zero crossing detection.

15. The system of claim 14 further comprising an attenuator of the back EMF sensing voltage.

16. The system of claim 14 wherein the fixed reference voltage is an attenuated supply voltage.

* * * * *

UNITED STATES PATENT AND TRADEMARK OFFICE
CERTIFICATE OF CORRECTION

| | | |
|---|---|---|
| PATENT NO. | : 7,301,298 B2 | Page 1 of 1 |
| APPLICATION NO. | : 11/082288 | |
| DATED | : November 27, 2007 | |
| INVENTOR(S) | : Jianwen Shao et al. | |

It is certified that error appears in the above-identified patent and that said Letters Patent is hereby corrected as shown below:

In the Specification:

At column 6, line number 43, please replace the phrase [R4, 5 and R6] with the phrase -- R4, R5 and R6 --.

In the Claims:

At column 7, claim number 1, line number 30, please replace [EMP] with -- EMF --.

At column 8, claim number 14, line number 46, please replace [EMIF] with -- EMF --.

Signed and Sealed this
Thirteenth Day of September, 2011

David J. Kappos
*Director of the United States Patent and Trademark Office*